United States Patent [19]
Barnett

[11] 3,839,079
[45] Oct. 1, 1974

[54] LAGGING CLOTH WOVEN OF STAPLE GLASS FIBER, AND CONTAINING REWETTABLE ADHESIVE

[75] Inventor: Irvin Barnett, Martinsville, N.J.

[73] Assignee: Johns-Manville Corporation, New York, N.Y.

[22] Filed: June 15, 1972

[21] Appl. No.: 263,026

Related U.S. Application Data

[63] Continuation-in-part of Ser. No. 40,729, May 26, 1970, abandoned.

[52] U.S. Cl. ............ 117/126 GF, 106/74, 106/84, 106/DIG. 4, 117/138, 117/169 R, 117/169 A, 138/DIG. 2
[51] Int. Cl. .................... B32b 17/02, C09j 1/02
[58] Field of Search .................. 106/DIG. 4, 84, 74; 117/126 GF, 169 A, 169 R, 70 S, 76 T, 138; 138/DIG. 149

[56] References Cited
UNITED STATES PATENTS

| | | | |
|---|---|---|---|
| 1,771,216 | 7/1930 | Gossler | 117/126 GF |
| 2,033,106 | 3/1936 | Cummins | 106/84 X |
| 3,009,829 | 11/1961 | Gouveia | 106/74 |
| 3,769,072 | 10/1973 | Eckerd | 117/169 R |

FOREIGN PATENTS OR APPLICATIONS

| | | | |
|---|---|---|---|
| 957,465 | 1/1957 | Germany | 117/126 GF |
| 731,119 | 6/1955 | Great Britain | 139/420 C |
| 1,117,950 | 6/1968 | Great Britain | 106/84 |

OTHER PUBLICATIONS

Raybestos–Manhattan Form 9201, 12/15/69 and Price List 10/1/70.

Primary Examiner—William D. Martin
Assistant Examiner—William H. Schmidt
Attorney, Agent, or Firm—John A. McKinney; Robert M. Krone; James W. McClain

[57] ABSTRACT

A lagging cloth woven of slivers of long staple glass fibers or yarns of continuous filament glass fibers, and containing a water activatable adhesive composition impregnated therethrough. The fiber glass cloth contains about 15 percent to 35 percent by weight of adhesive composition impregnant solids, the adhesive composition being at least 72 percent by weight bentonite clay and also containing alkali metal silicate in a ratio of 1 part by weight alkali metal silicate to 30–85 parts by weight of bentonite clay. Preferably the adhesive composition consists essentially of 72 percent to 85 percent by weight of bentonite clay, 1 percent to 2.4 percent by weight of alkali metal silicate and the balance being short asbestos or glass fibers.

13 Claims, No Drawings

LAGGING CLOTH WOVEN OF STAPLE GLASS FIBER, AND CONTAINING REWETTABLE ADHESIVE

This application is a continuation-in-part of Application Ser. No. 40,729, filed May 26, 1970, now abandoned.

BACKGROUND OF THE INVENTION

Lagging cloth or blankets constitute high-temperature and flame resistant fabric or felts commonly applied as protective coverings or sheathings for furnaces or boilers, electrical insulations, and components thereof such as boilers and turbines, steam and hot water pipes and conduits, hot gas ducts, electrical conduits, etc. Safety regulations often require such fireproof or flame-resistant coverings on high-temperature units or components in critical locations such as shipboard and power plants.

The lagging cloth may be applied by itself directly to the component, or as an outer wrap overlying and ensheathing thermal insulation placed about the component. Asbestos, for obvious reasons, has been the traditional basic material for the fabrication of lagging cloth or blankets.

SUMMARY OF THE INVENTION

This invention comprises wettable, glass fiber lagging cloth which is woven from slivers of long staple or continuous filament glass fiber. The cloth contains a rewettable adhesive composition impregnated therethrough of bentonite clay and sodium silicate or bentonite clay, asbestos or glass fiber, and sodium silicate. The invention provides various and diverse advantages over the prior art lagging cloth materials or products.

It is the primary objective of this invention to provide a lagging cloth integrally containing therethrough a rewettable adhesive composition which permits the initial application or reapplication simply by wetting with water and its effective and secure adherence to varied materials including smooth metal surfaces without sagging. The lagging cloth of this invention minimizes or eliminates potential health hazards considered attributable to asbestos, or dust derived therefrom, thereby satisfying the currently desired more stringent environmental standards; avoids chlorine induced corrosion of contacting metal parts attributable to the soluble chloride content of asbestos; and is overall more economical in both manufacturing and material cost as well as obviating dependency on a material of mineral source. Also, this lagging cloth is lighter in weight without reduced effectiveness in performance which is especially significant on shipboard and other mobile service. In one embodiment, this advantage is due to the greater diffusion and disarray of fibers in the woven slivers of the cloth and in turn the extended bulkiness thereof enabling the use of less material quantity without sacrificing coverage. In the other embodiment the advantage is due to the bulking of the yarn which also increases the bulkiness of the yarn to enable the use of less material. All of these improvements are attained while still performing in other aspects as effectively as prior products composed of asbestos and the like.

DESCRIPTION OF THE PREFERRED EMBODIMENT

The novel wettable lagging cloth of this invention is essentially composed of glass cloth, woven of slivers of relatively long staple glass fiber or yarns of continuous glass filaments, and impregnated with an adhesive composition of (a) bentonite clay and a minor amount of sodium silicate or (b) bentonite clay, asbestos or glass fiber, and a minor amount of sodium silicate.

Although the weave structure or pattern itself is not critical for the cloth in this invention, in one embodiment the glass cloth therefor is essentially woven from slivers or rovings of relatively long staple fibers of glass composition. The slivers or roving for the weaving of the cloth component consists of relatively long, typically within the approximate linear range of the majority between about 100 to about 500 millimeters (about 4 to 20 inches), staple glass fibers produced from essentially continuous glass filaments, laid or consolidated together in substantially parallel elongated bundles or units of twistless assemblies, or of slightly twisted roving-like bodies preferably wherein substantially only the outer or peripheral fibers of the strand body are somewhat spirally wound about the composite fiber strand rather than the composite fiber strand body being twisted about itself. Thus the composite staple fibrous strands for one embodiment of this invention encompass long staple fibers of glass laid or brought together in conventional textile assemblies as known in the art by the term "sliver," defining a loose, soft, untwisted strand or rope of fibers as formed by a carding or combing machine, and also including such forms therein known as "roving," defining a slightly twisted roll or strand of textile fiber material in an intermediate stage between a sliver and usual yarn. Long staple strands of glass fibers of the types suitable for this invention, and as described above, are disclosed in and produced pursuant to the means described U.S. Pat. No. 2,584,517 to Verreet, Feb. 5, 1952; U.S. Pat. No. 2,621,444 to Schuller, Dec. 16, 1952; and, U.S. Pat. No. 3,425,204 to Schuller et al., Feb. 4, 1969.

In another embodiment the glass cloth is woven from yarns of continuous glass filaments. The yarns are subjected to bulking as they are made to keep the filaments loosely associated so that the adhesive can better penetrate the yarn.

Although a plain weave of relatively loose construction, that is about five to 10 ends by about five to 10 picks per inch as typified by a very open homespun, is definitely preferred because of the objective of low weight, other weave systems such as a patterned weave or basket weave which produce a loose, soft, textile cloth can be utilized if the slivers, rovings, or yarns can, as a pratical matter, be handled in the loom without incurring excessive breakage. To minimize breakage of the loose, relatively incoherent, parallel and untwisted, or only slightly twisted, long staple fiber slivers or rovings in handling and weaving, it is preferred to apply thereto small amounts of common glass fibers size or binders such as phenolic or other usual resin sizes, oil, starch, gums, and similar common sizing materials such as about 1 to 5% thereof by weight of the strand or long glass fibers. In a like manner to minimize breakage of the loose parallel continuous filament yarns, small amounts of common glass fiber sizes or binders are applied to the yarns too.

A relatively loose or open-weave construction as provided by a low number of ends and picks per inch weave interlacing coupled with the requisite use of strands of twistless slivers, or at most slightly twisted rovings of relatively long staple glass fibers are factors primarily responsible for many of the advantages of the improved lagging cloth product of this invention. The open-weave with such slivers or rovings produce a very lightweight fabric of minimum fiber content in weight and yet of extended bulkiness in volume attributable to a high degree of fiber diffusion or disarray resulting from the strands of the twistless or slightly twisted condition of fibrous assemblies of the slivers or rovings employed. To a lesser extent the bulking of the continuous glass filaments of the second embodiment serves to maximize the bulkiness of that yarn to produce a lightweight fabric of low fiber content in weight. Essentially maximum coverage with minimum material quantity is achieved together with a high degree of impregnant retention.

One water activatable and rewettable adhesive composition employed with the aforementioned glass fabric comprises a combination of bentonite clay and, in relatively minor proportions, sodium silicate. The composition is applied to the glass fabric while dispersed in a water medium. The relative proportions of the impregnating composition, in percentage by weight totaling 100%, comprises:

| | |
|---|---|
| Bentonite clay | 96.8 – 98.8% |
| Sodium silicate | 1.2 – 3.2% |

The sodium silicate can be replaced by potassium silicate although the latter of the alkali metal silicates can be more costly and serves no better. The clay and alkali metal silicate are dispersed in about five to 10 times their weight of water and preferably about six times their weight in water. Such a dispersion can be applied to the cloth by means of any common impregnating technique including immersion, spraying, brushing or rolling thereon, etc. Immersion is preferred and the excess can be removed by squeeze rolls or wiping bars, etc. Retention of impregnant solids should be at least about 15 percent by weight of adhesive composition solids based upon the weight of the cloth, and preferably from about 20 to 30 or 35 percent by weight thereof with about 25 percent being sufficient to achieve good adhesion with resistance to wet sag and effective peel strength when applied to substantially any type of surface including metals and the like smooth materials.

Another water activatable and rewettable adhesive composition employed with the aforementioned glass fabric comprises a combination of bentonite clay, short asbestos or glass fiber and, in relatively minor proportions, sodium silicate, which is applied dispersed in a water medium. The relative proportions of the impregnating composition, in percentage by weight totaling 100 percent, comprises:

| | |
|---|---|
| Bentonite clay | 72 – 85% |
| Short asbestos or glass fiber | Remainder |
| Sodium silicate | 1 – 2.4% |

The asbestos fiber is preferably one of the shorter grades of about 5 to 7, Quebec Asbestos Mining Association, and the short glass fiber is chopped or milled glass fiber in about one-sixteenth to one-eighth inch lengths. The sodium silicate can be replaced by potassium silicate although the latter of the alkali metal silicates can be more costly and serves no better. The clay, asbestos or glass fibers and alkali metal silicate, dispersed in about five to 10 times their weight of water, preferably about six times their weight in water, can be applied to the cloth by means of any common impregnating technique including immersion, spraying, brushing or rolling thereon, etc. Immersion is preferred and the excess can be removed by squeeze rolls or wiping bars, etc. Retention of impregnant solids should be at least about 15 percent by weight of adhesive composition solids based upon the weight of the cloth, and preferably from about 20 to 30 or 35 percent by weight thereof with about 25 percent being sufficient to achieve good adhesion with resistance to wet sag and effective peel strength when applied to substantially any type of surface including metals and the like smooth materials.

In both of the above rewettable adhesive compositions, the weight of alkali metal silicate present is about 1.2 to 3.3 percent of the weight of bentonite clay present or a ratio of 1 part by weight alkali metal silicate to 30–85 parts by weight bentonite clay. It is the adhesive properties of the bentonite clay which enables the cloth to be adhered to a surface when rewetted. Since the adhesive composition is applied to the cloth in the form of a slurry, the alkali metal silicate is used in the composition to reduce the viscosity of the bentonite slurry so that better penetration of the cloth by the slurry can be obtained. In the amounts used, the ratio by weight of the alkali metal silicate to the bentonite clay is such that the alkali metal silicate does not act as a binder but as a means to reduce the viscosity of the bentonite slurry. It is important that the ratio by weight of the bentonite clay to the alkali metal silicate be kept within the limits set forth above. If too little alkali metal silicate is used, the viscosity of the bentonite slurry will not be altered sufficiently to improve the penetration characteristics of the composition. If to much alkali metal silicate is used, it will cause the bentonite clay particles to aggregate and precipitate.

The following comprises a specific illustration of a preferred application of this invention. The cloth of the lagging product is formed from bulked yarn of continuous glass filaments having applied thereto about 3 percent of phenolic resin solids by weight of the sliver to improve weaving durability. The cloth is of plain weave with about 10 ends by 10 picks per inch and weighing about 0.75 lb/sq. yard. It is immersed in a water dispersion comprising:

| Ingredients | Component by Weight in the Dispersion | | Dispersion % by Weight | Solids % by Weight |
|---|---|---|---|---|
| Water | 346 | lb | 88.6% | — |
| Bentonite Clay (Indian Head 325 mesh) | 43 | lb | 11.0% | 97.2% |
| Sodium silicate (Phila. Quartz Co. — STARSO) | 1.25 | lb | .4% | 2.8% |

The cloth is processed to retain approximately 40 gallons of impregnant per 100 lineal yards of cloth at 40 inches. Solids retention is about 25 percent by weight of the cloth.

The following comprises a specific illustration of a preferred application of this invention. The cloth of the lagging product is formed from slivers of long staple glass fiber as produced from the aforementioned Schuller patent procedure, having an average weight of about 2,200 yards to the pound, and applied thereto of about 3 percent of phenolic resin solids by weight of the strand to improve weaving durability. The cloth is of plain weave with about 7 ends by 7 picks per inch, and weighing about 0.25 lb/sq yard. It is immersed in a water dispersion comprising:

| Ingredients | Dispersion of Component in Weight | | Dispersion % by Weight | Solids % by Weight |
|---|---|---|---|---|
| Water | 346 | lb | 86.2% | — |
| Bentonite Clay (Indian Head 325 mesh) | 43 | lb | 10.8% | 78% |
| Asbestos fiber, Grade 7TF1 (Quebec Asb Mining Assoc.) | 11 | lb | 3.7% | 20% |
| Sodium silicate (Phila. Quartz Co. — STARSO) | 1.25 | lb | 0.3% | 2% | and processed to retain approximately 40 gallons of impregnant per 100 lineal yards of cloth at 40 inches, which is effected by passing the cloth through a bath consisting of the water dispersed adhesive composition followed by removal of excess with squeeze rolls. Solids retention is about 25 percent by weight of the cloth.

This product is adhesive while wet, and upon firm contact adheres easily, resists sag and provides a good bond. The dried lagging cloth provides a paintable surface with either oil or water-base paint, which thereafter renders it substantially water resistant providing a permanent attractive finish.

In the hereinafter claims of this specification the term — "slivers" is employed and intended to encompass and define both slivers and roving types of strands of parallel, and substantially parallel or only slightly twisted bundles or assemblies of long staple fibers of glass as described and defined hereinbefore, including specifically the staple glass fiber strand products of the said U.S. Pat. Nos. 2,584,517; 2,621,444; and, 3,425,204.

What I claim is:

1. A rewettable lagging cloth consisting essentially of a low density glass fiber cloth impregnated therethrough with a rewettable adhesive composition, said glass fiber cloth containing about 15 percent to 35 percent by weight of adhesive composition impregnant solids, said adhesive composition being at least 72 percent by weight bentonite clay and said adhesive composition also containing alkali metal silicate in a ratio of 1 part by weight alkali metal silicate to 30–85 parts by weight bentonite clay.

2. The rewettable lagging cloth of claim 1 wherein said adhesive composition consists essentially of, in percentages by weight, bentonite clay — 72 to 85 percent and alkali metal silicate — 1 to 2.4 percent with the remaining portion of the composition comprising short asbestos or glass fibers.

3. The rewettable lagging cloth of claim 1 wherein said adhesive composition comprises in percentages by weight, bentonite clay — 96.8 to 98.8 percent and alkali metal silicate — 1.2 to 3.2 percent.

4. The rewettable lagging cloth of claim 1 wherein the glass cloth contains approximately 20 percent to 30 percent by weight of adhesive composition impregnant solids.

5. The rewettable lagging cloth of claim 1 wherein the alkali metal silicate of the adhesive composition is sodium silicate.

6. The rewettable lagging cloth of claim 1 wherein said cloth is woven of glass slivers comprising long staple glass fibers.

7. The rewettable lagging cloth of claim 6 wherein the glass fiber cloth is of plain weave.

8. The rewettable lagging cloth of claim 7 wherein the glass fiber cloth is of a plain weave of relatively loose construction comprising about five to 10 ends by about five to 10 picks per inch.

9. The rewettable lagging cloth of claim 8 wherein the glass cloth contains approximately 20 percent to 30 percent by weight of adhesive composition impregnant solids.

10. The rewettable lagging cloth of claim 1 wherein said cloth is woven of bulked glass yarn of continuous glass filaments.

11. The rewettable lagging cloth of claim 10 wherein the glass fiber cloth is of plain weave.

12. The rewettable lagging cloth of claim 11 wherein the glass fiber cloth is of a plain weave of relatively loose construction comprising about five to 10 ends by about five to 10 picks per inch.

13. The rewettable lagging cloth of claim 12 wherein the glass cloth contains approximately 20 percent to 30 percent by weight of adhesive composition impregnant solids.

* * * * *